United States Patent [19]

Allread

[11] 4,119,111
[45] Oct. 10, 1978

[54] FRANGIBLE HOSE END FITTING

[75] Inventor: Alan R. Allread, Jackson, Mich.

[73] Assignee: Aeroquip Corporation, Jackson, Mich.

[21] Appl. No.: 700,095

[22] Filed: Jun. 28, 1976

[51] Int. Cl.² ............................................. F16K 17/40
[52] U.S. Cl. .................................. 137/68 R; 137/67; 251/149.6; 285/2; 285/174
[58] Field of Search ................. 137/67, 68 R, 69, 71; 251/149.2, 149.6, 149.7; 285/2

[56] References Cited

U.S. PATENT DOCUMENTS

| 2,492,271 | 12/1949 | Cox et al. | 251/149.2 X |
| 3,361,406 | 1/1968 | Cruse | 251/149.7 |
| 3,741,521 | 6/1973 | Tatsuno | 251/149.7 |
| 3,999,781 | 12/1976 | Todd | 285/174 X |
| 4,023,584 | 5/1977 | Rogers et al. | 285/2 X |

Primary Examiner—Alan Cohan
Assistant Examiner—Richard Gerard
Attorney, Agent, or Firm—Beaman & Beaman

[57] ABSTRACT

An end fitting for flexible hose consisting of a body formed by two separable portions interconnected by frangible means. The fitting body includes a valve normally held in the open position permitting unrestricted flow through the fitting and upon separation of the fitting portions the valve is displaced to a closed position closing the fitting to flow therethrough.

6 Claims, 13 Drawing Figures

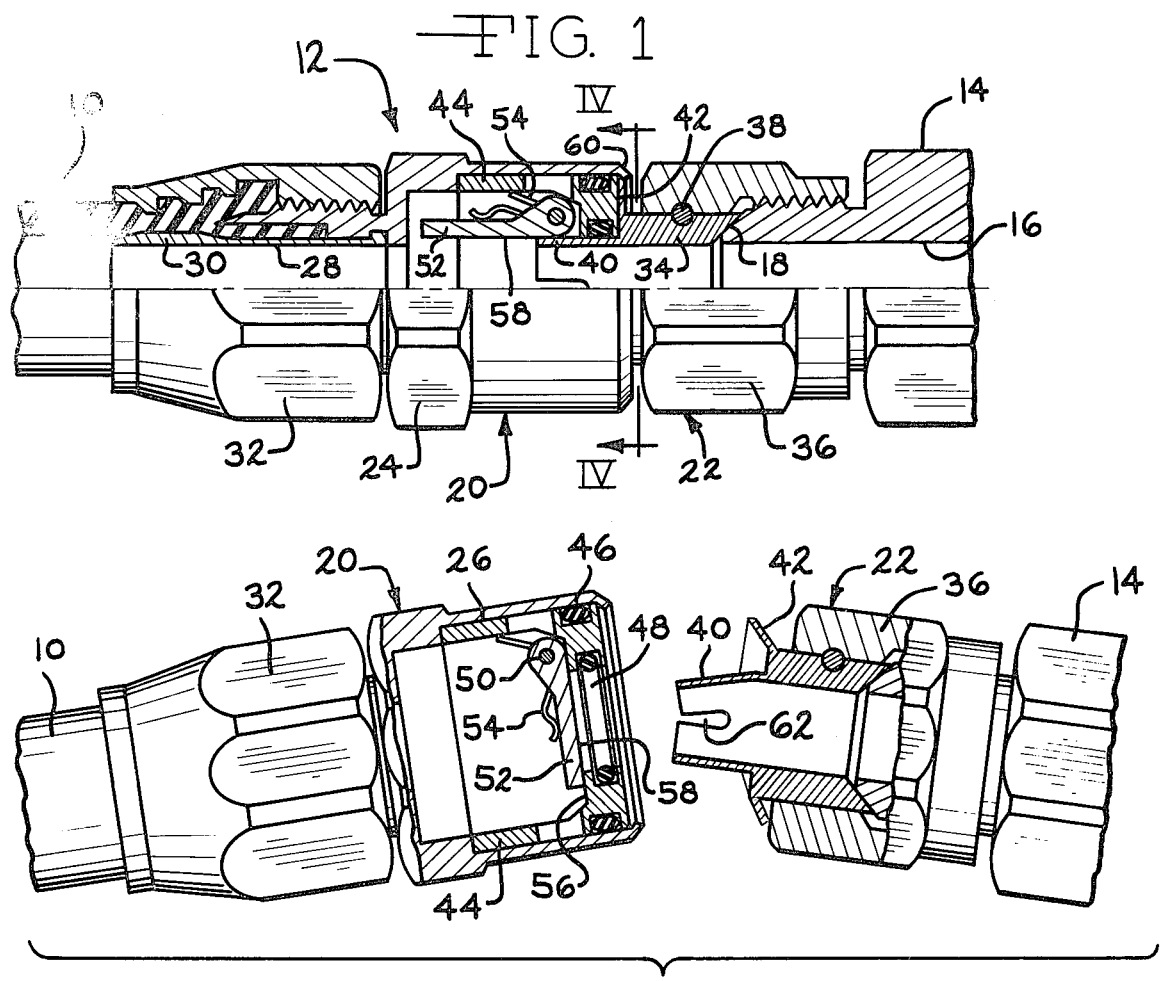
FIG. 1
FIG. 2
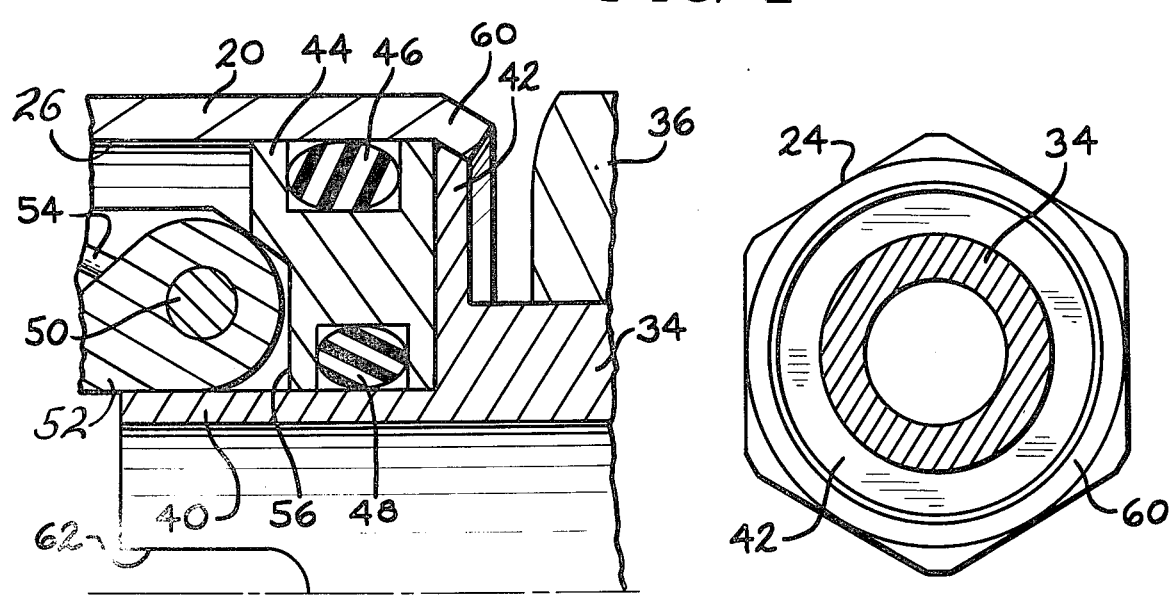
FIG. 3
FIG. 4

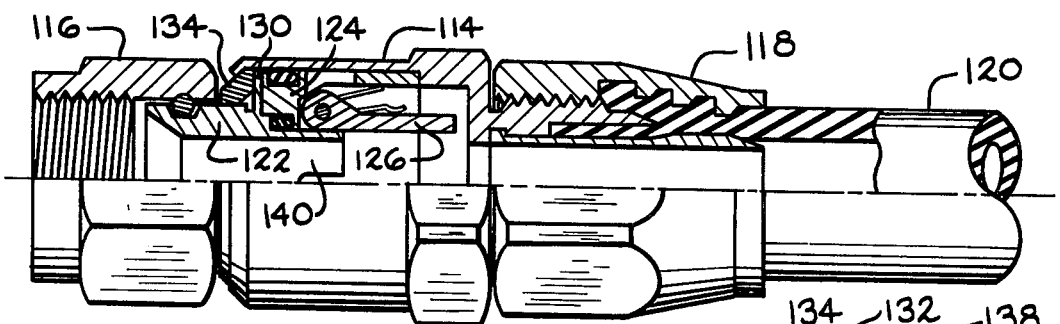
FIG. 9
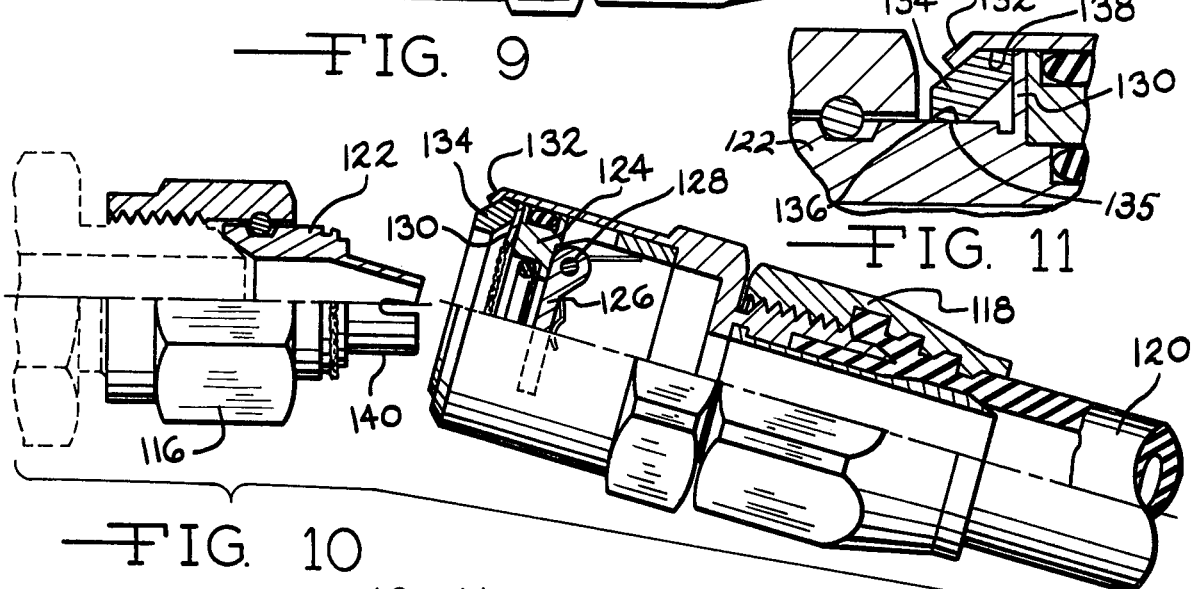
FIG. 10
FIG. 11
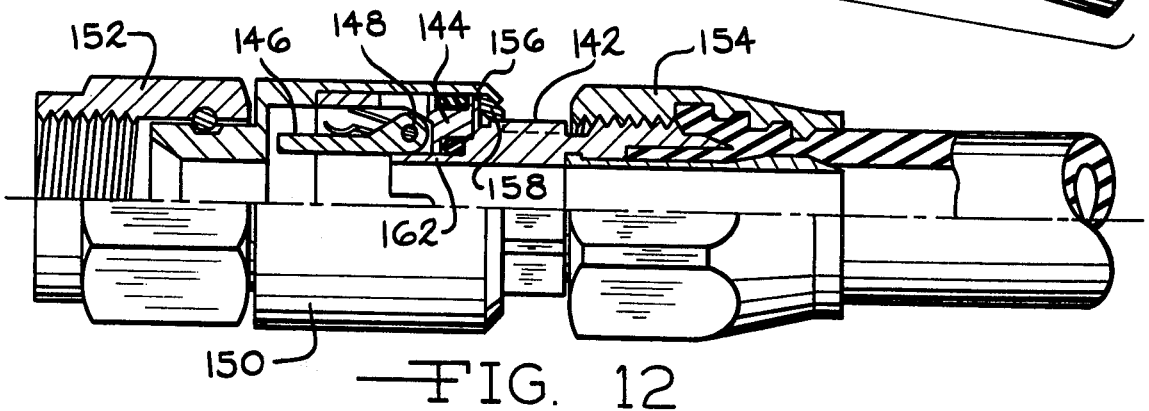
FIG. 12
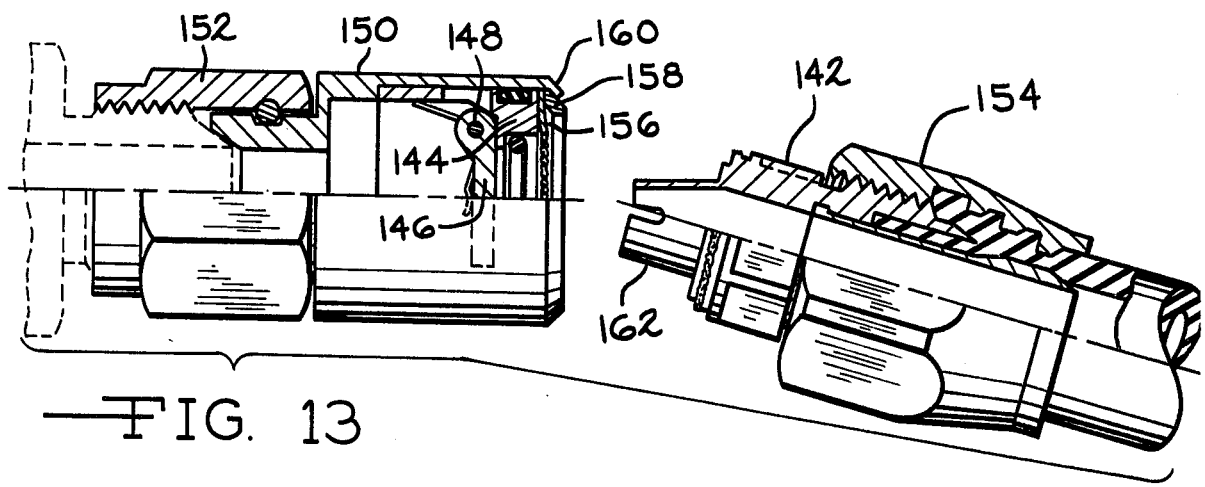
FIG. 13

FRANGIBLE HOSE END FITTING

BACKGROUND OF THE INVENTION

The invention pertains to hose end fittings for flexible hose wherein fluid flow through the fitting automatically terminates upon predetermined tension or shear forces applied to the fitting.

Crashworthy valved fittings are employed in installations wherein it is desired that fluid flow be immediately terminated within conduits damaged by exterior forces. Such crashworthy or frangible fittings are often employed in aircraft fuel lines wherein the fire hazard attendant with aircraft crashes can be significantly reduced if fuel line flow can be terminated upon separation of the fuel tank components from the aircraft. Such valves capable of automatically terminating fluid flow during crashes and collisions may also be used in automotive and marine installation, and would also be of value in conduit systems subject to possible earthquake damage.

Crashworthy fittings and couplings are known as disclosed in U.S. Pat. Nos. 3,542,047; 3,719,194; 3,797,510 and 3,913,603. However, such known fittings and couplings are expensive due to the complexity of their construction, difficult to assemble, and bulky in size, and are not readily usable with small diameter conduits. Further, such known crashworthy devices usually employ a pair of valves mutually operable through common actuating means adding to the complexity, cost and bulk of the couplings.

BRIEF DESCRIPTION OF THE INVENTION

It is an object of the invention to provide an end fitting for flexible hose which is of a frangible type as to permit fracturing of the fitting upon predetermined axial or radial forces being imposed thereon, such fracturing resulting in the automatic operation of a valve within the fitting terminating flow therethrough.

A further object of the invention is to provide an end fitting for flexible hose capable of automatically terminating fluid flow therethrough upon fracturing of the fitting wherein the fitting is of a concise configuration and relatively low cost, the fitting being substitutable for conventional hose end fittings in most instances.

In the practice of the invention a tubular flexible hose end fitting body is formed of two portions assembled by frangible means capable of fracturing upon predetermined axial or radial forces being imposed between the portions. Each portion includes a passage, the passages of the portions being coaxial and together defining a fluid flow passage through the fitting body. One of the portions includes means for attachment of the portion to the end of a flexible hose while the other portion includes connection means for attachment to a fitting connection of the conduit system with which the hose end fitting is employed.

A valve is located within the fitting body and, in the disclosed embodiments, the valve is either in the form of a pivotally mounted flapper, or a ball, and valve positioner means within the body normally maintain the valve displaced from the fitting passage so as not to interfere with fluid flow through the fitting. The valve support is fixed with respect to one of the fitting portions, while the valve positioner is fixed with respect to the other such that fracturing of the portion connection means and separation of the portions removes the valve positioner from the valve permitting the valve to close and terminate fluid flow through the fitting. In the disclosed embodiments the valve is so positioned such that flow through the fitting from the hose is prevented.

In the flapper valve embodiment a torsion spring is utilized to impose a biasing force on the flapper in the closing direction and in the ball embodiment a spring biased sleeve is utilized to force the ball to the closed position upon separation of the fitting portions.

In the construction of a fitting in accord with the invention the arrangement and configuration of components is such that the exterior appearance of the fitting is similar to conventional hose end fittings and is not of significant greater diameter than a comparable capacity conventional fitting although the fitting length will be somewhat longer than the usual hose end fitting. The fitting in accord with the invention meets the aforementioned objects and requisites of a crashworthy flexible hose end fitting and achieves the objects of the invention.

BRIEF DESCRIPTION OF THE DRAWINGS

The aforementioned objects and advantages of the invention will be appreciated from the following description and accompanying drawings wherein:

FIG. 1 is an elevational view, partially sectioned, illustrating a flapper valve embodiment of a flexible hose end fitting in accord with the invention, the components being illustrated in the normal, assembled, full flow relationship, FIG. 2 is an illustration of the fitting of FIG. 1 illustrating the disassembly and separation of the fitting portions upon fracture of the frangible connection means, illustrating the flapper valve in the closed position, FIG. 3 is an elevational, enlarged, detail sectional view of the frangible connection means of the embodiment of FIG. 1, FIG. 4 is an elevational, sectional view taken along section IV—IV of FIG. 1, FIG. 9 is an elevational view, partially sectioned, of another embodiment of flexible hose end fitting in accord with the invention in assembled relationship, FIG. 10 is a view of the embodiment of FIG. 9 after fracturing and separation of the fitting portions, FIG. 11 is a sectional, detail, enlarged view of the reinforcing ring and flange, FIG. 12 is an elevational view, partially sectioned, of another embodiment of fitting using a reinforcing ring in assembled relationship wherein the fitting end seals, and FIG. 13 is a view of the embodiment of FIG. 12 after fracturing and separation of the fitting portions.

DESCRIPTION OF THE PREFERRED EMBODIMENTS

Figure 5:
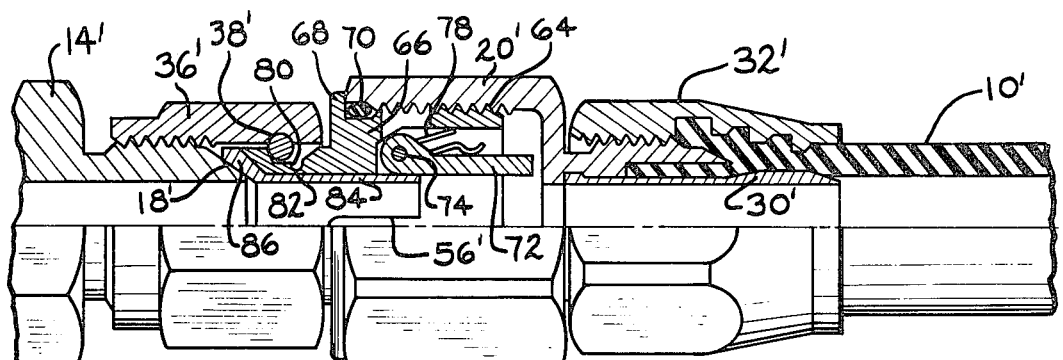
FIG. 5 is an elevational view, partially in section, of another embodiment of flexible hose end fitting in accord with the invention utilizing a flapper valve, the portions being illustrated in the assembled relationship.

With reference to FIG. 1, a flexible hose is represented at 10, the hose end fitting is generally indicated at 12, and the system component fitting to which the hose end fitting is attached is represented at 14.

The hose 10 is usually formed of rubber and is of the conventional type used in hydraulic systems, or air systems, usually consisting of an inner tube surrounded by reinforcing materials.

The fitting 14 to which the hose end fitting 12 is attached is of a conventional configuration having a passage 16 defined therein and including a threaded end having a conical sealing surface 18. The fitting 14 may be rigidly affixed to a fuel tank or other component and, in applications in which the fitting of the invention is usually employed, would be stationarily fixed.

The fitting 12 comprises a body formed of interconnected portions 20 and 22. The portion 20 includes an enlarged tubular portion having a hexagonal exterior configuration 24 to which a wrench may be applied. Internally, the portion 20 includes a cylindrical recess 26 and a passage 28 is defined by a threaded nipple 30 upon which the hose is received. The nipple includes threads upon which the threaded sleeve 32 is mated such that the hose may be mechanically attached to the portion 20 in a fluid tight manner.

In the embodiment of FIG. 1 the portion 22 includes the tubular cylindrical portion 34 having an enlarged wall thickness upon which the annular nut 36 is rotatably mounted by means of the drive wire 38 received within grooves formed in the nut and portion 34. The nut 36 is threaded for mating with the threads of the fitting 14, and the portion 34 includes a conical seating surface for sealingly engaging the fitting surface 18, FIG. 1.

The portion 22 also includes an axially extending sleeve 40 of a reduced wall thickness and the length of the sleeve is sufficient to axially extend a significant distance into the recess 26, as will be appreciated from FIG. 1. Further, the portion 22 includes a radial flange or lip 42 having a circular periphery of a diameter substantially equal to the diameter of the recess 26.

In the embodiment of FIG. 1 a valve cage 44 of a cylindrical configuration is pressed within the recess 26, and the cage includes an outer annular groove for receiving sealing O-ring 46, and an inner annular groove for receiving sealing O-ring 48. The cage also includes a pivot pin 50 upon which the flapper valve 52 is pivotally mounted and a torsion spring 54 wound about the pivot pin includes an end bearing upon the flapper valve, and an end bearing against the cage whereby a biasing force is imposed upon the flapper valve tending to rotate the valve in the counterclockwise direction, as viewed in FIG. 1.

The cage includes a flat radial valve seat surface 56, FIG. 2, against which the flapper valve engages when pivoted to the closed position to seal the fitting against fluid flow therethrough.

As will be noted in FIG. 1, the diameter of the recess 26 and cage 44 is such that the flapper valve 52, when in the open position, is pivoted out of the passage defined by the portions 20 and 22, which insures a linear flow of minimum resistance. The valve is held in the open position by the tubular sleeve 40 and, as will be noted in FIG. 1, the sleeve is of sufficient axial length to extend to the left past the pivot pin 50 for engagement with the flapper valve flat surface 58 to effectively hold the flapper valve in the fully open position under normal operating conditions.

The portions 20 and 22 are assembled by an annular bead or lip 60 which is bent over the periphery of flange 42 after the flange engages the cage 44. The wall thickness of portion 20 at the bead 60 is great enough to produce a high strength assembly by the bead.

In the event of a crash or severe impact which produces high axial forces in the hose 10 such forces are resisted by the flange 42. However, due to the limited axial thickness of the flange 42, the flange will bend if the forces are great enough permitting the periphery of the flange to pass under the fitting body bead 60 causing separation of the portions 20 and 22. Upon such separation occurring the sleeve 40 is pulled from engagement with the valve 52 and the valve will immediately pivot to the closed position preventing fluid flow through the fitting body portion 20. Bending and fracturing of the flange under axial forces usually occurs in the flange adjacent the portion 22, as will be noted in FIG. 2. It will be appreciated that the axial force necessary to separate the portions 20 and 22 is predetermined by regulating the thickness of the flange 42.

If the hose fitting 12 is subjected to a shear or bending force at right angles, or transversely disposed to, the axis of the fitting, such a bending force causes the "lower" portion of the flange 42 to bend to the right, while the "upper" portion of the flange will be pulled from the portion 20 as under a tension force. Simultaneously, the engagement of the sleeve 40 with the reduced diameter portion of the cage 44 causes a deformation in the sleeve which is facilitated by the relief notches 62 cut into the end of the sleeve and disposed at a 90° orientation to the point of sleeve engagement with the flapper valve. Thus, the sleeve will be deformed as shown in FIG. 2 as the portions 20 and 22 are separated under shear and tension forces. As before, the separation of the fitting body portions removes the sleeve from engagement with the flapper valve 52 and the valve will pivot to its closed position.

From the above description it will be appreciated that the fitting portions 20 and 22 will separate under tension and bending forces, or any combination of such forces, and upon separation of the fitting portions operation of the valve automatically occurs. The torsion spring 54 will pivot the flapper valve to the closed position and such movement of the valve is also augmented by fluid pressure acting thereon within the fitting.

Figure 6:
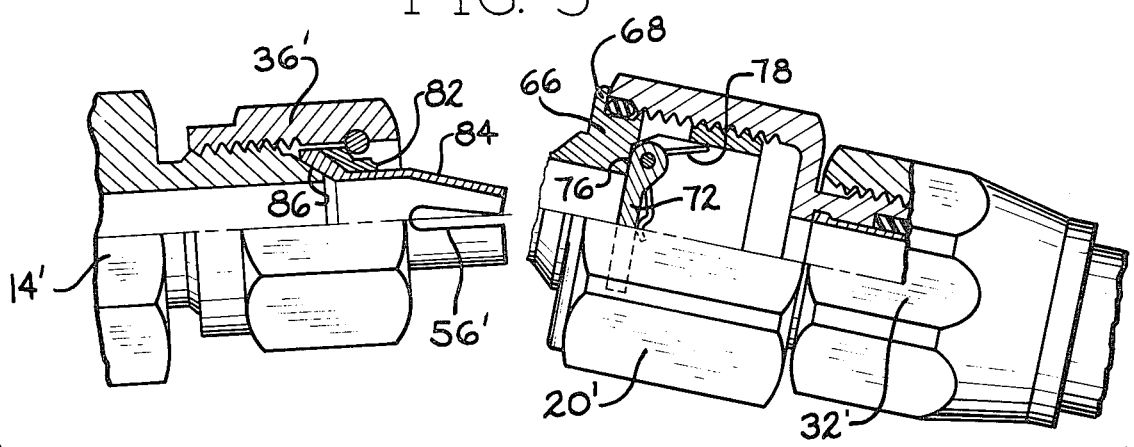
FIG. 6 is a partially sectioned view of the embodiment of FIG. 5 illustrating the fracturing and separation of the portions, with the flapper valve in the closed position.

A variation in construction of a hose fitting in accord with the invention is illustrated in FIGS. 5 and 6 and in this embodiment components identical or similar to those previously described are indicated by similar primed reference numerals. In this embodiment the fitting body 20' is internally threaded at 64, and the portion 66 is exteriorly threaded for mating with the threads 64. The portion 66 is provided with a shoulder 68 engaging the end of the fitting portions 22' and sealing is accomplished through an O-ring 70. The flapper valve 72 is pivotally mounted within the portion 66 upon pin 74 and is biased toward the valve seat 76 and the closed position by torsion spring 78.

The portion 66 is annularly weakened by a groove 80 to define a frangible annular wall portion 82 intermediate the drive wire 38' and the fitting portion 20'. The valve 72 is held in the open position by a sleeve 84 slidably received within the portion 66, and the sleeve includes a conical portion 86 of increased wall thickness engageable with the fitting 14' for engaging with the fitting sealing surface 18'.

Upon excessive tension, bending or shear forces being imposed upon the hose 10' or fitting 12, the portion 82 will fracture permitting separation of the portions 20' and 66 and the valve 72 will automatically close to prevent fluid loss.

Figure 7:
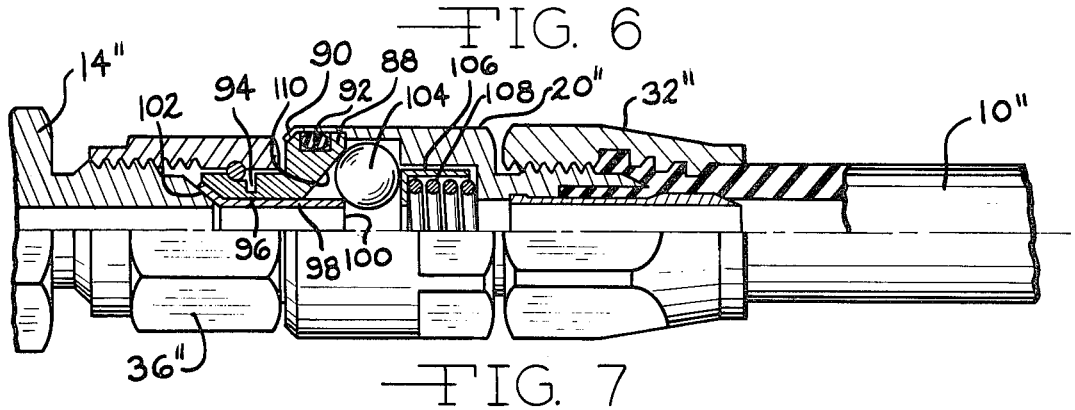
FIG. 7 is an elevational view, partially sectioned, of another embodiment of flexible hose end fitting in accord with the invention utilizing a ball-type valve, the ball being held in the open position and the fitting portions being assembled.
Figure 8:
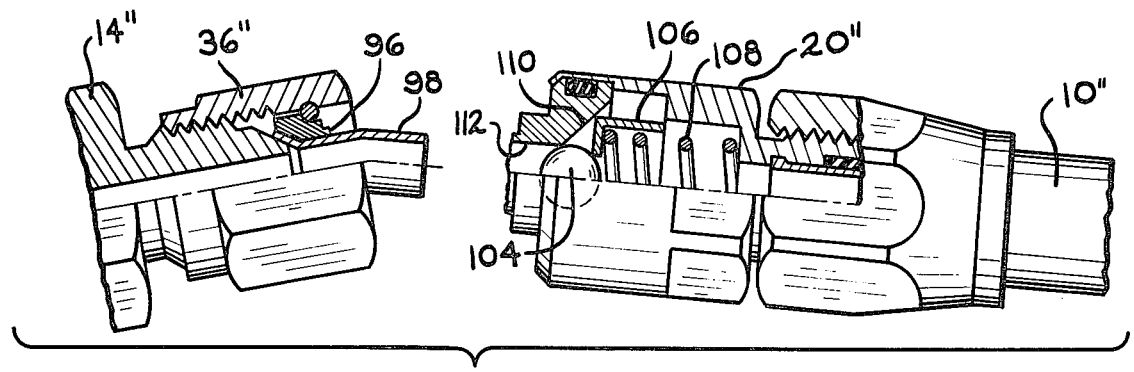
FIG. 8 is an elevational, partially sectioned, view of the fitting of FIG. 7 after fracturing and separation of the fitting portions, the ball valve being in the closed position.

Another embodiment of the inventive concept is shown in FIGS. 7 and 8 wherein components similar to those previously described in FIGS. 1 and 2 are identified by double primes. This embodiment is particularly suitable for use with fittings and hose of smaller diameters and utilizes a ball valve rather than a flapper valve.

The portion 88 is affixed to the portion 20" by a lip 90 and sealed to the portion by O-ring 92. The portion 88 is provided with a groove at 94 to form a weakened frangible portion 96 and the sleeve 98 is slidably received in the portion 88 having an end 100 extending into the portion 20", and a conical left end 102, FIG. 7, serving as a sealing surface with the fitting 14". Within the recess of the fitting portion 20" a ball or sphere valve 104 is located which is held in a radially displaced position by the sleeve end 100, as shown in FIG. 7, out of the flow path through the fitting passage. An annular spring collar 106 is also located within the fitting portion 20" and is biased toward the left into engagement with the ball 104 by a compression spring 108.

Upon tension, bending or shear forces fracturing the portion 96 to permit separation of the portions 20" and 88, the spring 108 and collar 106 force the ball 104 to the left. The portion 88 is provided with a conical valve seat surface 110 to facilitate such displacement of the ball and the ball is of a diameter greater than the bore 112, FIG. 8, defined in the portion 88 so that the ball will seal at the intersection of the bore 112 and surface 110 as shown and thereby prevent fluid flow from the hose end fitting.

Another embodiment of a hose end fitting incorporating the concepts of the invention is shown in FIGS. 9-11. In this embodiment, and that shown in FIGS. 12 and 13, an annular ring is used to reinforce the flange to increase the resistance of separation of the fitting portions under bending stresses.

With reference to FIGS. 9-10, the end fitting includes a portion 114 to which the nut 116 is rotatably attached by the conventional drive wire. The sleeve 118 is threaded upon the fitting portion 114 and hose 120. The portion 114 supports the annular portion 122 upon which the nut is mounted and the portion 122 supports and is seatingly associated with the annular gate element 124 upon which the gate 126 is mounted upon pivot 128. A spring biases the gate toward the closed position shown in FIG. 10.

Assembly of the portions 114 and 122 is maintained by the annular radial flange 130 and the lip 132. An annular support ring 134 is interposed between the outer portion of the flange 130 adjacent its periphery and the inner end of the ring 134 includes a surface 135 which engages the coaxial cylindrical surface 136 defined upon member 122. The annular ring also includes a cylindrical surface 138 which engages the inside of the cylindrical surface of member 114. In assembly, the extension 140 of member 122 extends into portion 114 sufficiently to engage the gate 126 and hold the same in the open position shown in FIG. 9.

Upon the end fitting being subjected to tension forces parallel to the axis of the hose 120, the flange 130 will fracture once these forces exceed a predetermined value. In such instance the flange 130 will break in the manner described in the aforementioned embodiments. However, in some end fittings the specifications require a fracturing of the flange 130 under bending forces at a force greater than that which can be obtained by a flange 130 having an axial thickness and radial dimension sufficient to achieve fracturing at the desired specifications with respect to axial forces. In those instances where it is not possible to achieve the desired resistance to both axial and bending forces merely by varying the dimensions of the flange the annular ring 134 is employed to reinforce the flange 130 against fracturing under bending forces. This reinforcement results from the fact that the outer portion of the flange engages the ring 134 while the inner surface 135 of the ring engages the member 122 and, in effect, the ring 134 acts as a brace to stiffen the flange 130 from fracturing and thereby permit the desired resistance to bending to be achieved. As apparent in FIG. 10, once the flange 130 is fractured the extension 140 is withdrawn from engagement with the gate 126 and the gate closes to prevent fluid flow through the hose and fitting 114.

In the embodiment of FIGS. 12 and 13 the annular fitting body 142 supports the annular gate member 144 on which the gate 146 is mounted upon pivot pin 148. The element 150 surrounds the gate member 144 and nut 152 is rotatably attached to the member 155 by the usual drive wire. Sleeve 154 threads upon threads defined upon member 142, as well as upon the material of the hose.

Flange 156 formed upon member 142 is engaged by the annular ring 158 which is held in place by the lip 160 and, in assembly, the gate 146 is maintained in the open position by the extension 162, as shown in FIG. 12.

As described above, the annular ring 158 reinforces the flange 156 against breakage under bending forces and, thus, the desired resistance of the flange to fracture under both axial and angular forces is achieved. This embodiment distinguishes over the embodiment of FIGS. 9-11 in that the gate 146 is mounted upon the portion upon which nut 152 is supported and upon fracturing of the flange 156, as shown in FIG. 13, the gate will close and seal the element 150 against fluid flow, rather than sealing the hose, as is the case in the previously described embodiment.

It will therefore be appreciated that the use of the annular ring provides a reinforcement of the flange permitting the end fitting to sustain relatively high bending forces without fracturing and yet permit flange fracture at the predetermined axial force value.

It will be appreciated that in all embodiments of the inventive concept the objects of the invention have been accomplished. A hose end fitting of relatively concise radial and axial dimensions is achieved which is capable of automatically sealing the hose end fitting against fluid flow upon separation of the fitting portions. Fittings constructed in accord with the invention may be used in those installations accommodating conventional fittings not capable of fracturing and automatically closing the hose end fitting to fluid flow and, thus, such fittings may be readily incorporated into those installations requiring crashworthy operation without modification to the other components of the conduit system.

In the above description the components 20 and 22, 20' and 66, 20" and 88, 114 and 122, and 142 and 150 are described as separate portions. Separation of these components is necessary for manufacturing and assembly purposes. To permit operation of the end fittings in accord with the inventive concept, the parts of these portions in which the valve and valve positioning sleeves are mounted must separate and in the following claims the separable parts of the portions are individually identified as first and second parts.

It is appreciated that modifications to the inventive concept may be apparent to those skilled in the art without departing from the spirit and scope of the invention.

I claim:

1. A frangible hose end fitting comprising, in combination, a fitting body having an axis, and a coaxial passage defined therethrough, said body being defined by an interconnected hose attachment portion and a fitting connection portion, hose attachment means defined on said hose attachment portion, fitting connection means defined on said fitting connection portion, a valve within said body mounted upon one of said portions movable between open and closed positions, an annular radially extending flange defined upon one of said portions and having an outer periphery affixed to the other portion, said flange fracturing under predetermined tension or bending forces being imposed upon said portions permitting separation of said portions, an annular ring mounted upon said body engaging said body axially spaced from said flange and engaging said flange adjacent its outer periphery to brace said flange against bending fracture, and valve positioning means mounted on the other portion comprising a tubular sleeve concentric with said passage holding said valve in said open position and out of alignment with said passage and releasing said valve to the closed position upon fracturing of said flange.

2. In a frangible hose end fitting as in claim 1, said annular ring having an outer cylindrical periphery and an inner cylindrical surface, said one body portion having said valve mounted thereupon including a cylindrical thin wall extension radially spaced from and concentric to said body axis having an inner surface and a circular free end, said other body portion on which said valve positioning means is mounted including a cylindrical surface adjacent said flange, said ring outer periphery engaging said extension inner surface adjacent said free end and said ring inner surface engaging said other body portion cylindrical surface adjacent said flange.

3. In a frangible hose end fitting as in claim 2 wherein said extension free end is deformed inwardly toward said body axis defining a lip radially disposed over and engaging said ring.

4. A frangible hose end fitting comprising, in combination, a fitting body having an axis, and a coaxial passage defined therethrough, said body being defined by an interconnected hose attachment portion and a fitting connection portion, hose attachment means defined on said hose attachment portion, fitting connection means defined on said fitting connection portion, a valve within said body mounted upon one of said portions movable between an open position permitting flow through said passage and a closed position closing said passage to flow therethrough, frangible means interconnecting said fitting connection portion and said hose attachment portion, said frangible means comprising a radial flange having a periphery defined on one of said portions and an annular radially extending member defined on the other of said portions deformed over said flange periphery affixing said fitting connection portion to said hose attachment portion, and valve positioning means within the other of said portions comprising a tubular sleeve concentric with said passage holding said valve in said open position and out of alignment with said passage and releasing said valve to the closed position upon fracturing of said frangible means.

5. In a frangible hose end fitting as in claim 4, an annular ring having an outer portion engaging said flange adjacent said flange on the side of said flange remote from said valve and an inner portion engaging said fitting body whereby said ring reinforces said flange against fracturing under bending forces.

6. A frangible hose end fitting comprising, in combination, a fitting body having an axis, and a coaxial passage defined therethrough, said body being defined by an interconnected hose attachment portion and a fitting connection portion, hose attachment means defined on said hose attachment portion, fitting connection means defined on said fitting connection portion, a flapper valve within said body pivotally mounted upon one of said portions movable between an open position permitting unrestricted flow through said passage and a closed position closing said passage to flow therethrough, a spring biasing said valve toward said closed position, frangible means interconnecting said fitting connection portion and said hose attachment portion, said frangible means comprising a radial flange having a periphery defined on one of said portions and an annular radially extending member defined on the other of said portions deformed over said flange periphery affixing said fitting connection portion to said hose attachment portion, and valve positioning means within the other of said portions comprising a tubular sleeve concentric with said passage holding said valve in said open position and out of alignment with said passage and releasing said valve to the closed position upon fracturing of said frangible means.

* * * * *